United States Patent
Hollmann et al.

Patent Number: 5,675,406
Date of Patent: Oct. 7, 1997

[54] PORTABLE DEVICE FOR ENSURING THAT A CENTER THICKNESS OF A LENS IS WITHIN A PREDETERMINED TOLERANCE

[75] Inventors: Joerg Hollmann, Midland; Gabor Devenyi, Penetang; Kevin Wagner, Crescent Barrie, all of Canada

[73] Assignee: Hughes Electronics, Los Angeles, Calif.

[21] Appl. No.: 545,186

[22] Filed: Oct. 17, 1995

[51] Int. Cl.⁶ .................................................. G01B 9/00
[52] U.S. Cl. ........................................ 356/124; 356/381
[58] Field of Search ................................. 356/124–127, 356/381, 382, 376, 375; 65/29.14

[56] References Cited

U.S. PATENT DOCUMENTS

| | | | |
|---|---|---|---|
| 3,619,067 | 11/1971 | Howland | 356/125 |
| 3,804,523 | 4/1974 | McCormack | 356/124 |
| 4,072,428 | 2/1978 | Moss | 356/125 |
| 4,209,252 | 6/1980 | Arditty et al. | 356/124 |
| 4,359,282 | 11/1982 | Garrison | 356/376 |
| 4,564,296 | 1/1986 | Oshida et al. | 356/381 |
| 5,483,347 | 1/1996 | Hollmann | 356/375 |

*Primary Examiner*—Hoa Q. Pham
*Attorney, Agent, or Firm*—Gordon R. Lindeen, III; Michael W. Sales; Wanda K. Denson-Low

[57] ABSTRACT

A portable lens measuring device (10) comprises a plurality of optical fibers (23) and a lamp (18) for providing light to a common end. The portable lens measuring device (10) includes a sensor (32) for detecting light from the common end through the second arm, the light sensor (32) generating a signal responsive to the amount of light detected, and a lens assembly (25), the lens assembly being connected to the common end and having a fixed focal point. The portable lens measuring device (10) includes a controller (12) for controlling the lens assembly (25), for regulating the lamp and for receiving the signal generated by the detector. The portable lens measuring device (10) also includes a sensor motor (14) for moving the lens assembly (25) across a first and second surfaces of the lens to provide a value of the center thickness of the lens. The controller (14) of the portable lens measuring device stores the value of the center thickness, compares the value of the center thickness to a reference value, and determines if the difference between the value of the center thickness and the reference value is within a predetermined threshold.

11 Claims, 6 Drawing Sheets

PORTABLE DEVICE FOR ENSURING THAT A CENTER THICKNESS OF A LENS IS WITHIN A PREDETERMINED TOLERANCE

FIELD OF THE INVENTION

The present invention relates generally to a device for measuring the center thickness of a lens and more particularly to a portable measuring device of the center thickness of a lens.

BACKGROUND OF THE INVENTION

The ability to accurately measure the center thickness of a lens is important to ensure that the lens is within a specified tolerance range. For example, when a lens is being polished to a specified tolerance, it is oftentimes required that the lens is measured periodically to determine whether the lens thickness is within the specified tolerance range. A conventional method for determining whether a particular lens is polished to the desired tolerance comprises polishing the lens for a predetermined period of time, removing the lens from the holder and measuring the lens. If the lens is below the negative tolerance, that is, the lens center thickness is too thin, the lens has to be rejected. If the center thickness of the lens is a above the positive tolerance, that is, the lens' center thickness is too thick, then the lens has to be mounted again and polished until the lens center thickness is within the specified tolerance. The removal of the lens significantly increases the time required for polishing the lens to the desirable dimensions. In addition, the above described system requires precise remounting of the lens, particularly in those instances where the tolerance range of the the center thickness is very small.

There are known methods for optically determining the thickness of the lens without physically removing it from the holder. In general, one of the more common methods of optically determining the thickness of a lens, or other reflective surface, is by laser interferometry. In such an instrument, the laser is directed toward the surface and the reflected interferogram is formed in accordance with the rules of light cancellation or reenforcement depending upon the phase of the signals. For example, if the reflected light is one hundred and eighty degrees out of phase with the incident light the light reflected is cancelled and a dark ring is exhibited on the interferogram. It is well known that laser interferometers are capable of measuring very small changes in the thickness of an optical material. However, such techniques are quite expensive and introduce problems relating to eye safety. Further, such techniques, to operate most efficiently, require a highly reflective surface.

Hence, what is needed is an apparatus for measuring the thickness of a lens as it is being polished that is highly accurate and relatively inexpensive. It is also desired that the apparatus be portable and so as not to require removal of the lens from the holder. Finally, this system should be one which is cost effective. The present invention addresses such a need.

SUMMARY OF THE INVENTION

A portable device that is utilized to ensure that a lens is within a predetermined tolerance is provided in accordance with the present invention. The device comprises a bifurcated bundle of optical fibers having first and second arms and a common end, means for providing light to the common end through the first arm, means for detecting light from the common end through the second arm, the light detecting means generating a signal responsive to the amount of light detected, and a lens assembly, the lens assembly being connected to the common end and having a fixed focal point. The lens measuring device also includes means for controlling the apparatus, the control means regulating the means for providing light and for receiving the signal generated by the means for detecting light, means for moving the lens assembly across a first and second surfaces of the lens to provide a value of the center thickness of the lens; and means for storing the value of the center thickness. The lens measuring device further includes means for comparing the value of the center thickness to a reference value, and means for determining if the difference between the value of the center thickness and the reference value is within a predetermined threshold.

Through the portable lens measuring device of the present invention, the lens can be measured accurately and relatively inexpensively without removing the lens from a holder or the like.

DETAILED DESCRIPTION

The present invention is directed toward an improvement in lens measurement devices when the lens is located in a holder. The following description is presented to enable one of ordinary skill in the art to make and use the invention as provided in the context of a particular application and its requirements. Various modifications to the preferred embodiments will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

Figure 1:
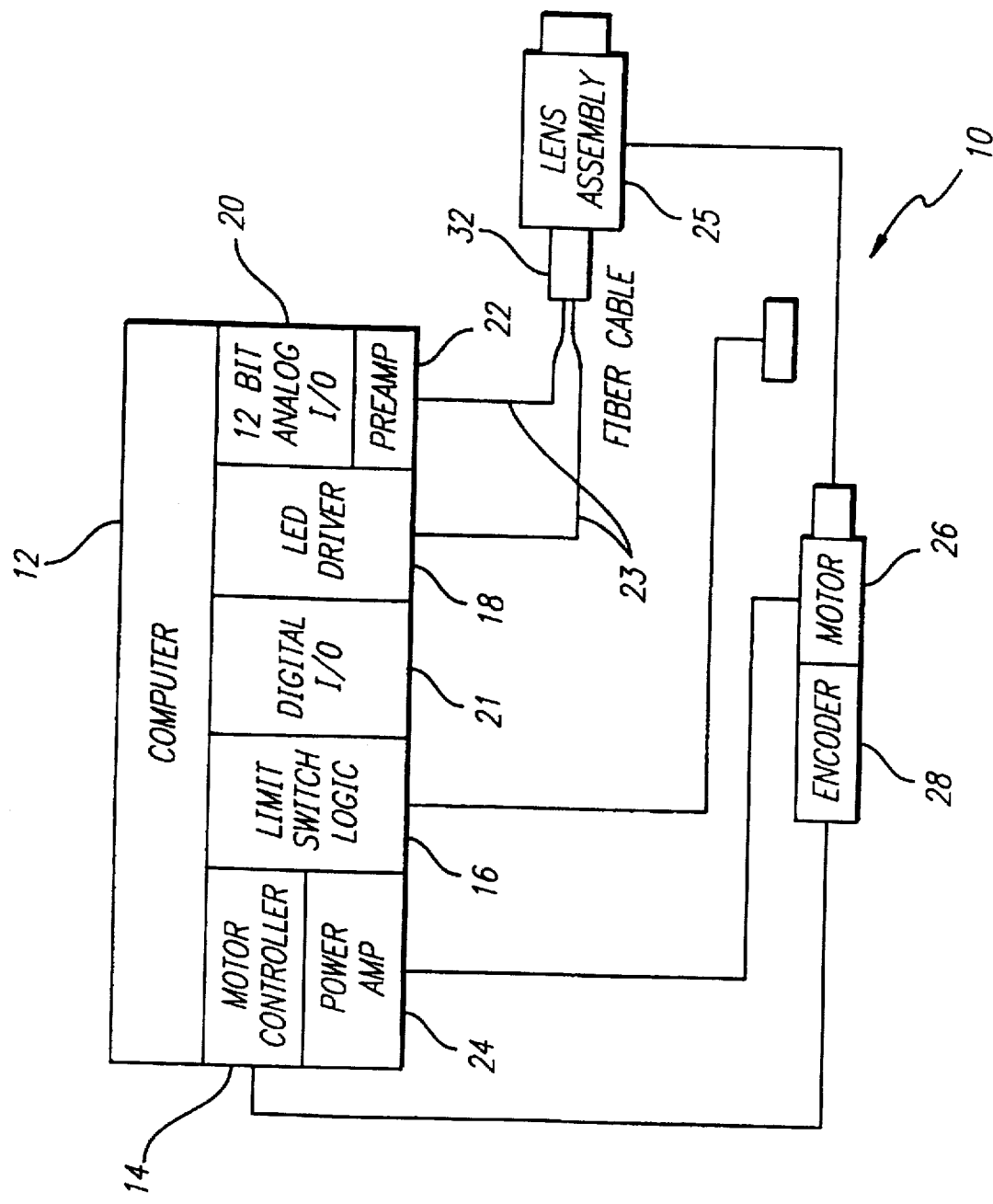
FIG. 1 is a diagram showing the electronics for a portable lens measuring device in accordance with the present invention.

Referring now to FIG. 1 shown is a block diagram of a center thickness lens measuring device 10 in accordance with the present invention. The device 10 in a preferred embodiment includes a computer 12 which controls a motor servo system 14, switch logic 16, an light emitting diode (LED) driver 18 and an analog to digital (A/D) converter 20. The computer also in a preferred embodiment includes input/output (I/O) interface circuitry 21 and custom software.

The A/D converter 20 is coupled to a preamplifier 22. The motor servo system 14 in turn is coupled to a power amplifier 24. The motor servo system 14 includes in a preferred embodiment means for providing incremental feedback signals to allow for more precise control of the motor servo system 14. The power amplifier 24 is coupled to a motor 26. The motor servo system 14 is also coupled to an encoder 28 which is also coupled to the motor 26. The LED driver 18 and the preamplifier 22 are coupled via fiber cables 23 to an optoelectric sensor 32 which comprises in this embodiment a light emitting diode. The motor in turn is coupled to a lens assembly 25 in which the lens to be measured is placed to allow for the measurement thereof.

Figure 2:
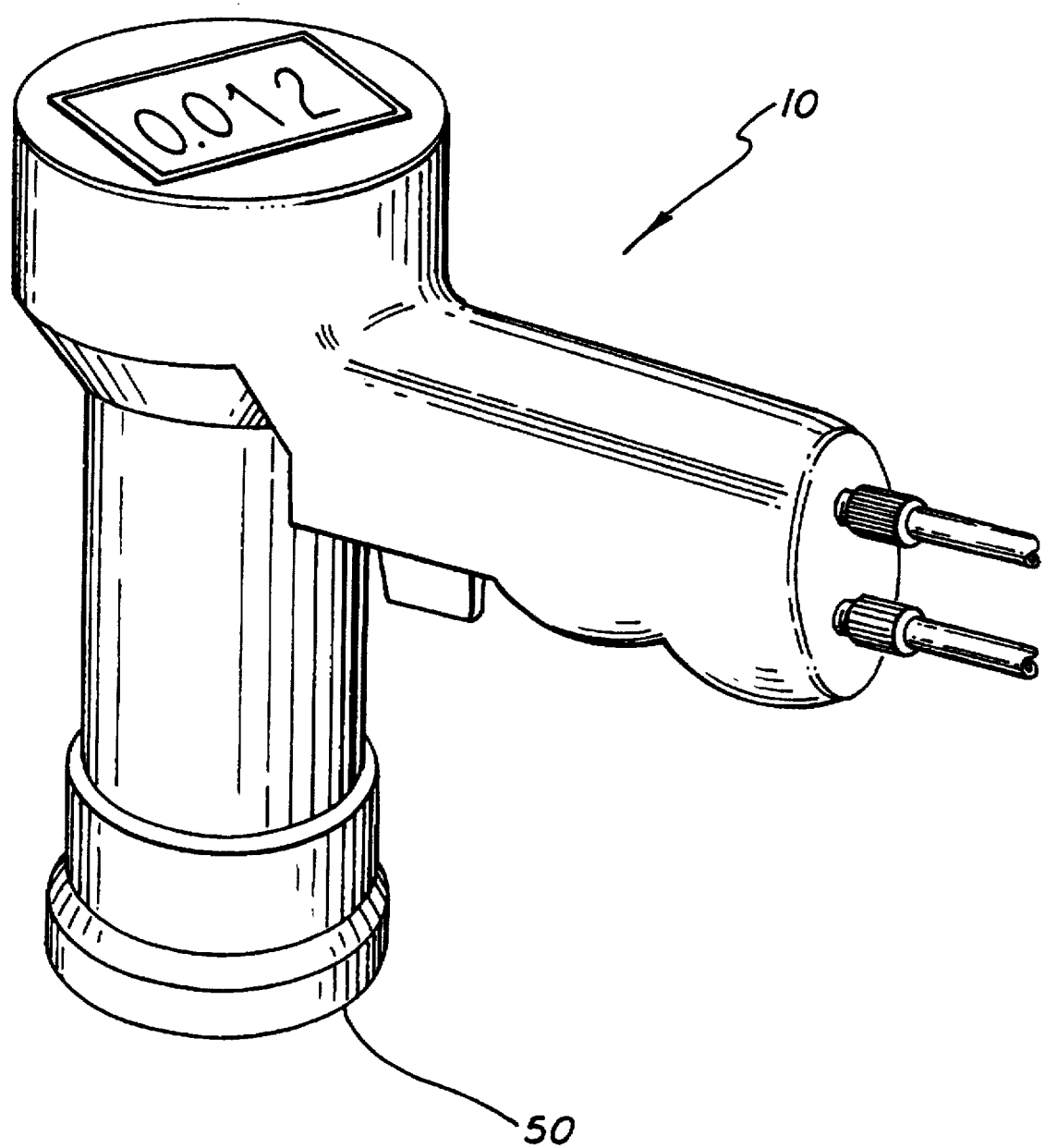
FIG. 2 is a perspective view of a portable lens measuring device.

Referring now to FIG. 2 what is shown is a perspective view of one embodiment of the portable measuring device 10 in accordance with the present invention. In a preferred embodiment, the device 10 includes a color corrected high resolution objective with a working distance of particular distance such as, 40 mm and a bifurcated fiber optic cable with randomly mixed fibers. The common end of the fiber cable is placed close to the focus point of the objective, to fill the opening diameter of the fiber cable with the reflected surface image of the object to be measured.

A detailed description of such a fiber cable system is included in commonly assigned and copending U.S. patent application Ser. No. 08/067,500, entitled NON-CONTACT MEASUREMENT APPARATUS PD-Z91003 which is incorporated by reference in its entirety herein. In that copending application a non-contact measuring apparatus is shown which is an improvement over the prior art in that it utilizes a bifurcated bundle of optical fibers, the first portion of which is adapted to convey light from a light source and the second portion which is adapted to convey light through a detector and through this system a measurement can take place.

Figure 2A:
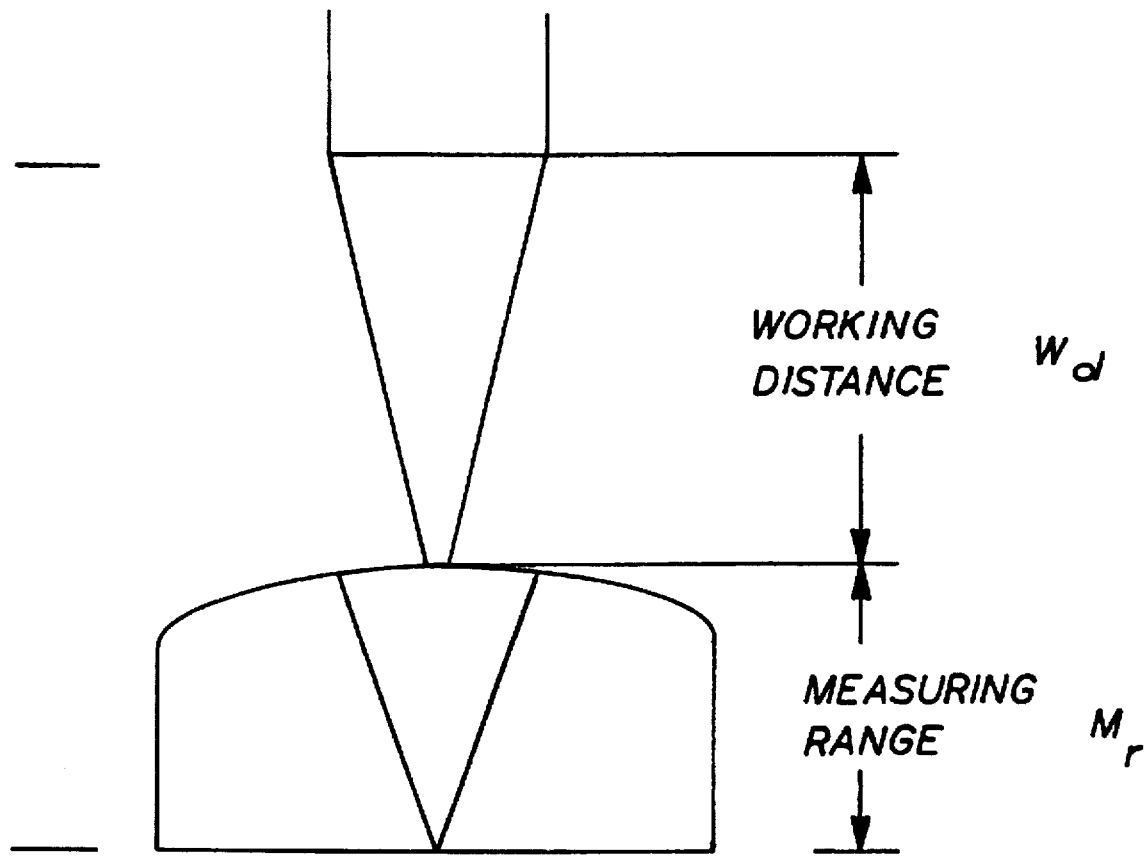
FIG. 2A is a diagram showing the important measurements for determining the center thickness of a lens.

Referring to FIG. 2A, the measurement cycle is a scan-motion of the objective and fiber cable through the focal point (working distance) of the objective. The measuring range is limited only by the focal length of the objective (working distance) and the refractive index of the lens. The system in accordance with the above described patent application is utilized for example, in the portable measuring device 10 for testing of a lens' center thickness during polishing process.

Figure 3:
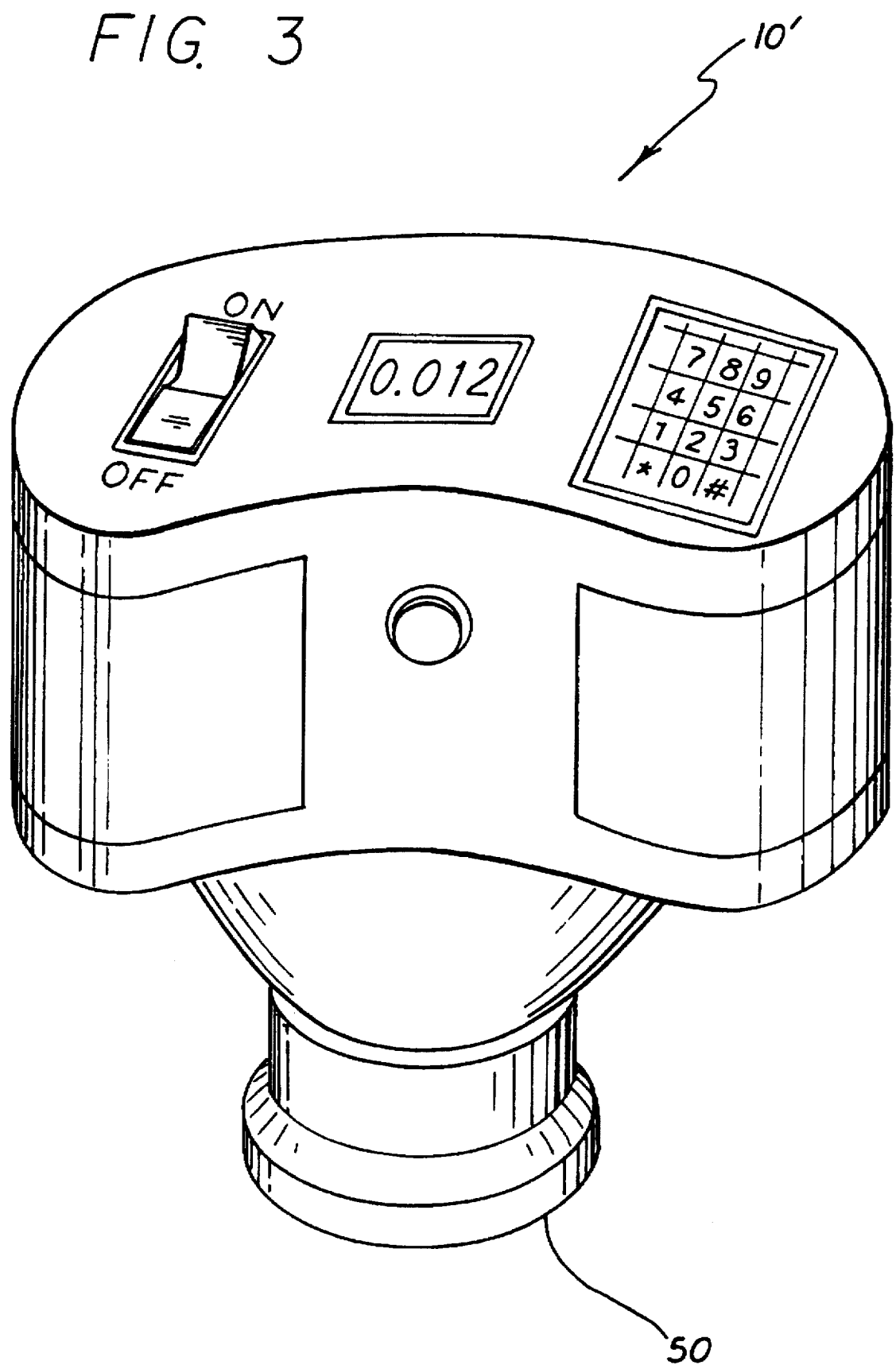
FIG. 3 is a second perspective view of a different lens measuring device.

In operation, the portable device 10 rests on the top surface of the lens to be measured. The bifurcation bundle of optical fibers coupled to the sensor 32 (FIG. 1) scans the top surface, then scans the back surface. The calibration can be made with a master lens or by the inclusion of the refractive index of the material into a measurement algorithm. Referring now to FIG. 3 another embodiment of the portable device 10' is shown. In either embodiments of FIGS. 2 or 3 a lens adapter 50 could be utilized. Different adapters can be placed over the sensor typically made of plastics to accommodate different lens sizes.

Figure 4:
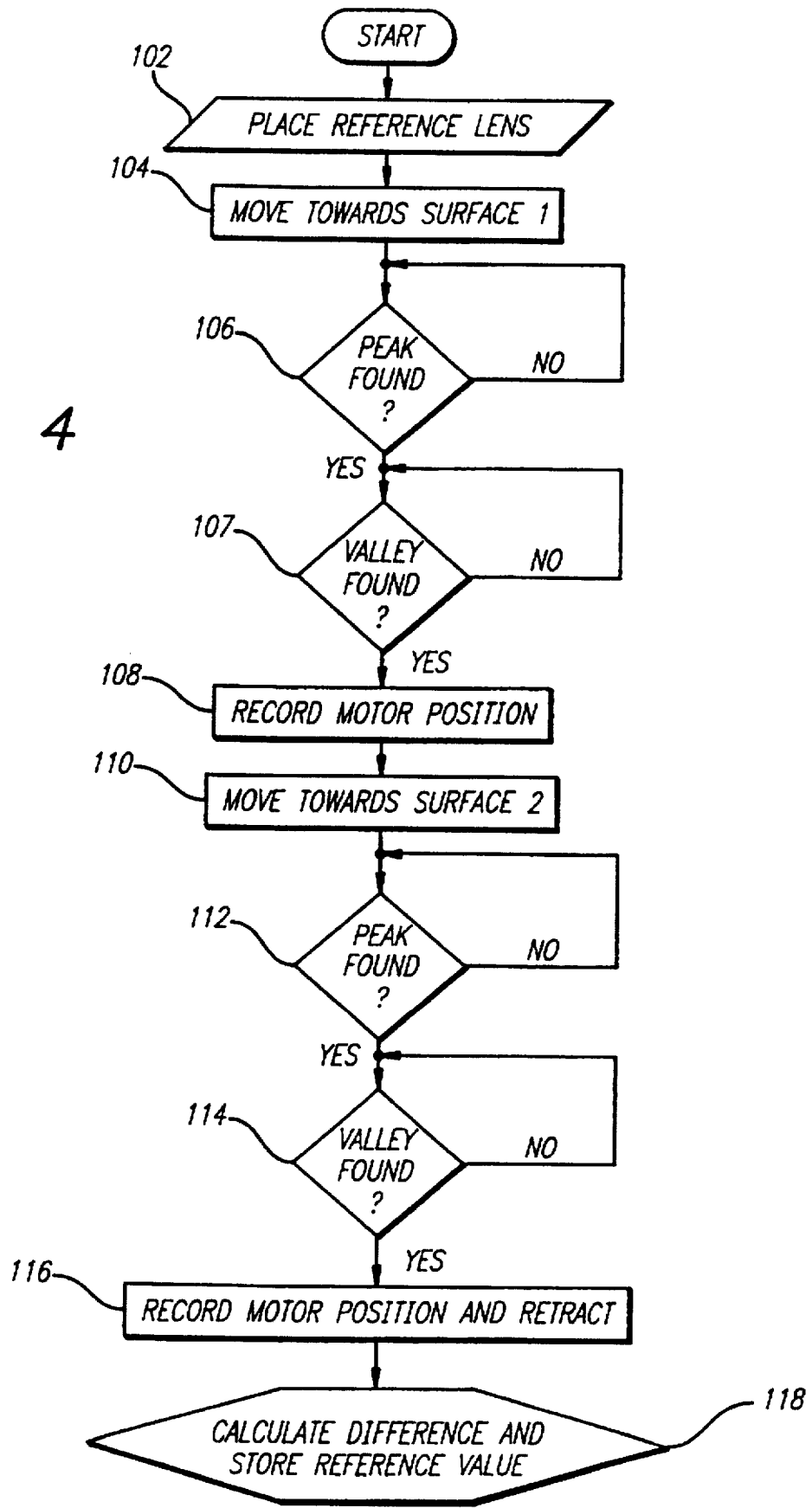
FIG. 4 is a flow chart of the operation of the lens measuring device when setting up a reference level.
Figure 5:
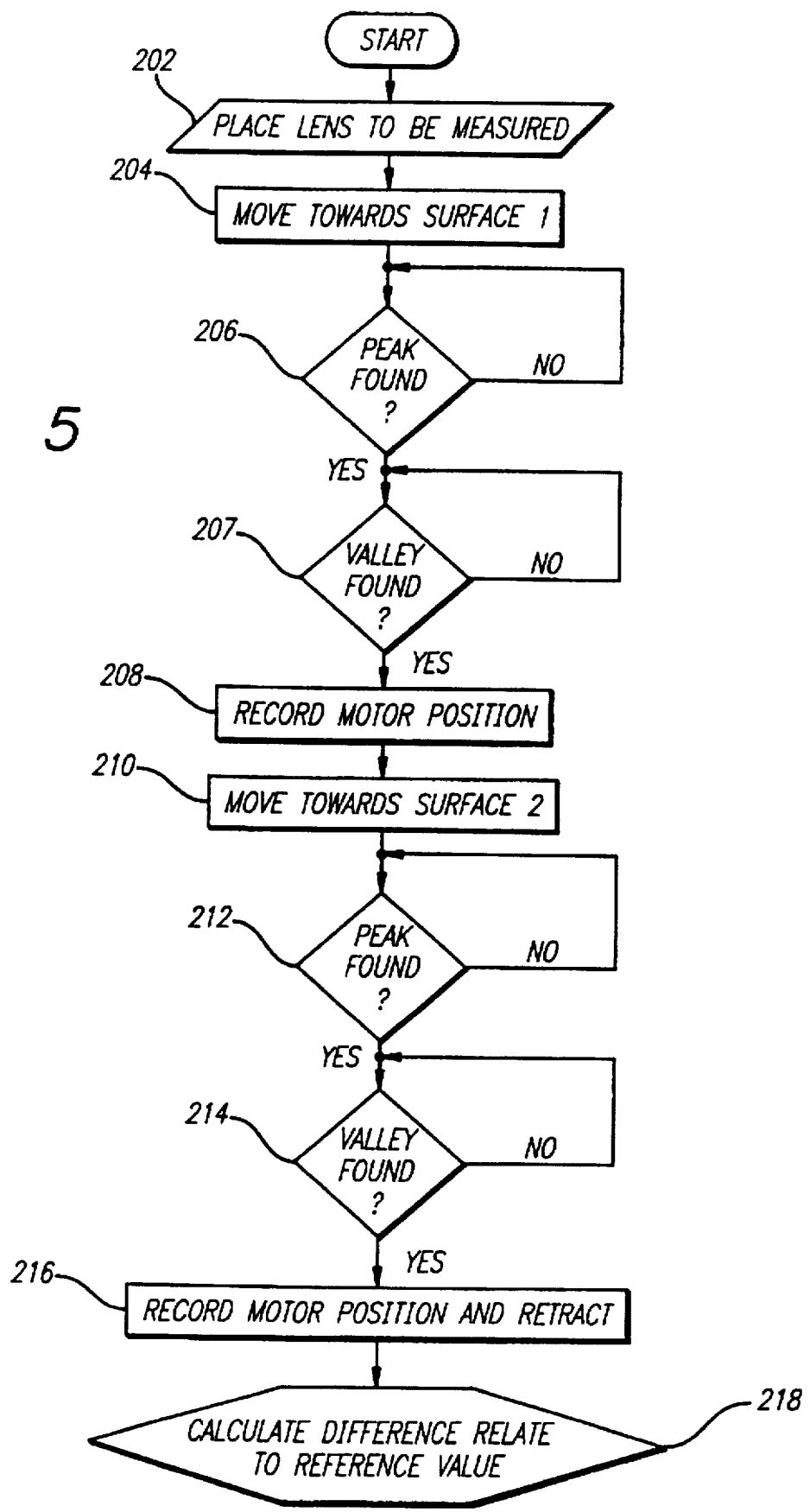
FIG. 5 is a flow chart of the operation of the lens measuring device when measuring a new lens.

To more particularly describe the operation of such a system, refer now to FIGS. 4 and 5 which are flow charts that describe the operation of the present invention. In FIG. 4, a reference value of the lens is provided by first placing a reference lens in the device via step 102. The device is then moved toward a first surface of the lens via step 104 to determine a highest point or peak value of the reference lens, via step 106. The device is moved across the first surface until the peak value is found. Once the peak value is found on the lens, then a lowest point or valley value of the lens must be determined, via step 107. The device is moved across the first surface until the valley value on the lens is found. Once the peak and valley values on the lens have been found, then the motor position is recorded, via step 108.

The same process is then repeated for the opposite or second side of the reference lens via steps 110–116. Thereafter, a difference between the motor positions of the first and second surfaces are utilized to calculate a reference value based upon that difference, via step 108. Once this reference value is stored, then the lens to be measured is placed in the device.

Referring now to FIG. 5 what is shown is a flow chart for the measurement of a lens after a reference value is stored. First, the lens to be measured is placed in the device via step 202. The device is then moved toward a first surface of the lens, via step 204 to determine the highest point or peak value of the lens, via step 206. The device is moved across the first surface until the peak value is found. Once the peak value is found, then a lowest point or valley value of the lens must be determined, via step 207. The device is moved across the first surface until the valley value is found. Once the peak and valley values on the lens have been found, the motor position is recorded, via step 208.

The same process is then repeated for the opposite or second side of the lens via steps 210–216. The motor positions are then utilized to provide a value which indicates the center thickness of the lens. Thereafter, this lens value is compared to the stored reference value to determine if the lens is within the desired parameters, via step 218. If the lens is not within the desired parameters, the procedure of FIG. 5 is repeated after the lens is polished.

To resolve the analog scan signals with a high resolution, a precision motor servo system 14 (FIG. 1) is utilized. Some typical systems that can be utilized as the motor system are described below:

a) Direct coupled precision DC-Motors with encoder.

A DC-Motor includes an encoder that translates 2000 pulses per rotation.

b) Precision stepper motors with open loop computer controlled microstepping.

The microstepping system includes a stepper motor with 100 poles and a sinusoidal torque curve will be driven by computer generated sine-cosine signals which are read out of bit tables in this embodiment the bit table being 256 bits wide. A full cycle through the sine-cosine tables rotates the motor axis over 4 magnet poles. In this example, the resolution is: 100 poles/4×256=6400 and therefore, 0.5/6400=0.000078 mm.

c) A DC-Motor with playfree gearbox and encoder.

A DC-Motor with playfree gearbox for example a 10:1 ratio and encoder with 16 pulses per rotation would provide a resolution of 0.5/10×16×4=0.000781 mm.

All of the above systems could be utilized to provide a high resolution system. These systems would interact with the software of the computer to provide the center thickness of the lens to be measured.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims:

What is claimed:

1. A portable device for ensuring that a lens is within a predetermined tolerance, comprising:

a lamp for providing light to the plurality of optical fibers;

sensor means for detecting light from the lamp, the sensor means for generating a signal responsive to the amount of light detected;

a lens assembly for holding the lens;

motor means for moving the lens assembly across first and second opposing surfaces of the lens to provide a value of the center thickness of the lens;

control means coupled to the lamp and the sensor means for regulating the lamp and for receiving the signal generated by the sensor means;

means responsive to the motor means for storing the value of the center thickness;

means responsive to the storing means for comparing the value of the center thickness to a reference value; and threshold means responsive to the comparing means for determining if the difference between the value of the center thickness and the reference value is within a predetermined threshold.

2. The device of claim 1 in which the motor means further comprises:

means for moving the lens assembly across the first surface which is opposite the first surface coupled to moving means for determining a lowest position on the lens;

means coupled to the lowest position determining means for moving the lens across the first surface for determining the highest position on the lens; and means responsive to the lowest and highest position determining for providing a first position of said motor means.

3. The device of claim 2 in which the moving means further comprises:

means for moving the lens assembly across the second surface coupled to moving means for determining a lowest position on the lens;

means coupled to the lowest position determining means for moving the lens across the second surface for determining the highest position on the lens; and means responsive to the lowest and highest position determining means for providing a second position of the motor means.

4. The device of claim 3 in which the first and second positions of the motor means are utilized to provide the value of the center thickness of the lens.

5. The device of claim 1 in which the motor means comprises a direct coupled DC motor.

6. The device of claim 1 in which the motor means comprises a precision stepping motor.

7. The device of claim 1 in which the motor means comprises a DC motor including an encoder.

8. A method for determining a center thickness of a lens is within a predetermined tolerance comprising the steps of:

a) placing the lens in a holder;

b) first determining a highest and lowest point on a first surface of the lens;

c) recording a first position of the holder in relation to the first surface of the lens;

d) second determining a highest point and a lowest point on the second surface of the lens, the second surface being on an opposite side of the lens from the first surface;

e) recording a second position of the holder in relation to the second surface of the lens;

f) calculating a center thickness value from the recorded first and second positions of the holder; and g) comparing the center thickness value to a reference value.

9. The method of claim 8 in which the first determining step (b) further comprises the steps of:

(b1) moving the holder across the first surface for determining a highest position on the lens;

(b2) moving the holder across the first surface for determining the lowest position on the lens; and (b3) recording a first position of the holder.

10. The method of claim 9 in which the second determining step (d) further comprises the steps of:

(d1) moving the holder across the second surface for determining a highest position on the lens;

(d2) moving the holder across the second surface for determining the highest position on the lens; and (d3) recording a second position of the holder.

11. The method of claim 10 in which the first and second recorded positions of the holder are utilized to provide the value of the center thickness of the lens.

* * * * *